Feb. 27, 1945.   R. J. NEBESAR   2,370,322

MOLDING, SHAPING AND UNITING APPARATUS

Filed Aug. 29, 1942

WITNESS:

INVENTOR
Robert J. Nebesar
BY
Busser & Harding
ATTORNEYS.

Patented Feb. 27, 1945

2,370,322

UNITED STATES PATENT OFFICE 2,370,322

MOLDING, SHAPING, AND UNITING APPARATUS

Robert J. Nebesar, Bristol, Va., assignor to Universal Moulded Products Corporation, Bristol, Va., a corporation of Delaware Application August 29, 1942, Serial No. 456,648

1 Claim. (Cl. 144—281)

This invention relates to improved apparatus for shaping, molding or uniting materials such as veneer boards, etc., into molded articles or parts. In particular, the invention relates to apparatus for use in the quantity production of articles molded and shaped from wood veneer sheets under fluid pressure with a thermo-plastic or thermo-setting adhesive.

It is well known that the production of molded wooden veneer articles under fluid pressure bonded with thermo-setting or thermo-plastic adhesives has been done in pressure tanks using collapsible air- and water-tight containers, the interior of which is connected by relief means to the open air.

The procedure heretofore followed is, however, unsatisfactory for quantity production since the use of such containers is necessary; their loading is a lengthy procedure, and so is their deposit into the pressure tank. For bulky objects, great precautions must be taken not to damage the collapsible containers, which must sometimes be put around complicated shapes without much stretching in order to maintain absolute tightness. Furthermore, the adjustment of the relief means leading from the interior of such containers is also a lengthy and risky procedure resulting in a great amount of faulty processing and rejections.

It is the purpose of the present invention to facilitate a reliable quantity production of molded articles, and to provide suitable apparatus for the carrying out of the necessary operations.

In accordance with this invention the structures to be molded are formed about forms or mandrels, usually made with wood cores. These forms or mandrels are sometimes hollow inside and are then designed to withstand the external fluid pressure used in molding. They are placed on top of or made integral with platforms of the thickness required to withstand the same external fluid pressure.

The platform is preferably of rounded shape with grooves provided on its vertical edges. A collapsible, impervious blanket can be placed over the structure to be molded, the mandrel, and the top of the platform. The blanket sides may be secured initially in the circumferential grooves of the platform edge by means of rubber or wire bands.

The upper face of the platform is connected with the under side, which is provided with valve means and a suitable nipple for connection to the vacuum pump. The platform may also be provided with caster wheels for easy handling.

In operation, after sufficient vacuum has been established under the blanket, the whole unit is placed inside an operating chamber where the desired pressure and temperature necessary for molding are established.

The accompanying drawing illustrates a preferred embodiment of the invention in which.

Figure 1:
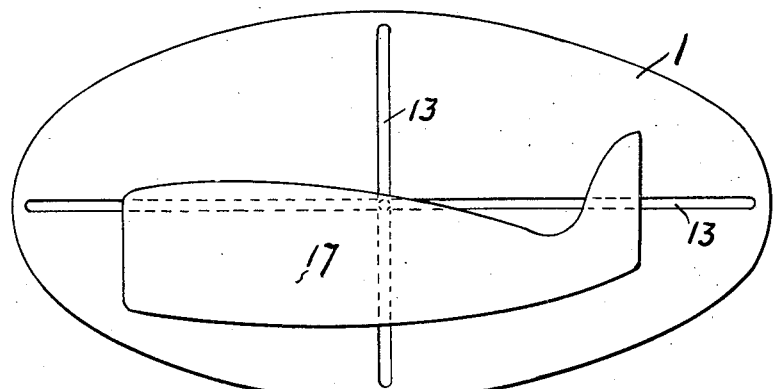
Figure 1 is a plan view of a molding platform in accordance with this invention, showing a mandrel positioned thereon.
Figure 2:
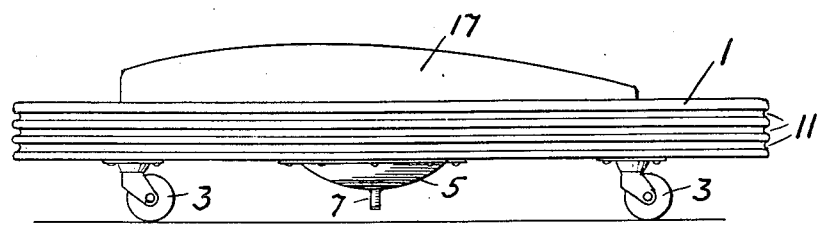
Figure 2 is a side view of the structure shown in Fig. 1.

As shown in the drawing the molding platform 1 is provided with casters 3; a vacuum reservoir or chamber 5 secured to its under side and sealed by gasket 9; circumferential grooves 11 in its vertical sides or edges; intersecting channels 13 on its upper face; and a valve controlled conduit 15 communicating with the channels 13 and vacuum chamber 5.

A mandrel or form 17 is positioned upon the upper face of the platform 1, reinforcing members or struts 19 for the object being molded are inserted in channels provided for that purpose in the mandrel, and the veneer sheet 21, which with the struts 19 has been treated with a suitable thermo-plastic or thermo-setting adhesive, is laid over the struts and mandrel.

A flexible, impervious blanket 23 of, for example, rubber, is now placed carefully over the veneer sheet 21, in position upon the mandrel 17, and the entire platform 1. The edges of the blanket 23 are secured in the grooves 11 by means of elastic cords or wire bands 25 so as to form a relatively air-tight seal.

Figure 3:
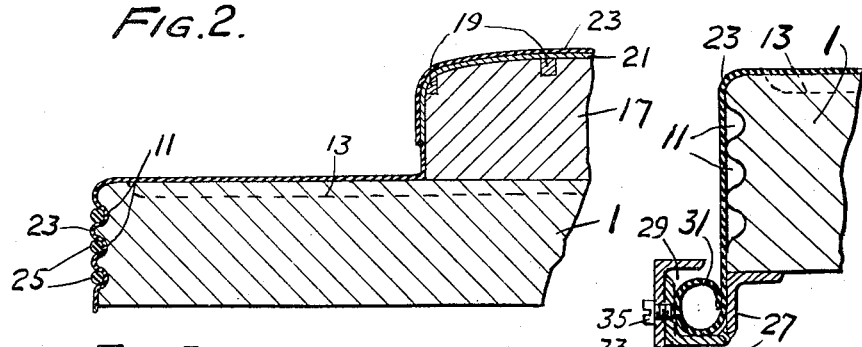
Figure 3 is a detail view, partly in section, showing the material to be molded and the impervious blanket in position.

The nipple 7 secured to the vacuum chamber 5 is then connected to a suitable source of vacuum, as a vacuum pump, and the chamber 5 and space beneath the blanket 23 evacuated, valves 8 and 10 opening under the pressure differential so established. Atmospheric pressure will now force the blanket 23 tightly upon the mandrel and platform, conforming it exactly to the shape of the article being molded and forcing the blanket tightly into the grooves 11 to form a perfectly air-tight seal, as shown in Fig. 3. Any necessary adjustments can now be made by hand.

The vacuum line may now be removed from the nipple 7, vacuum being maintained beneath the blanket by valves 8 and 10, and the entire apparatus moved conveniently to the operating chamber in which it will be subjected to the desired molding temperature and pressure.

Figure 5:
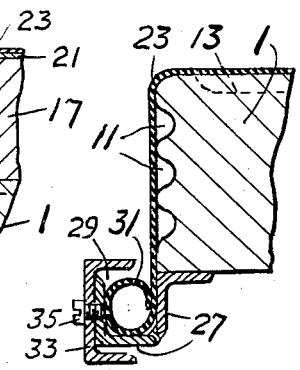
Figure 5 is a detail sectional view showing modified means for initially securing the impervious blanket to the platform.
Figure 4:
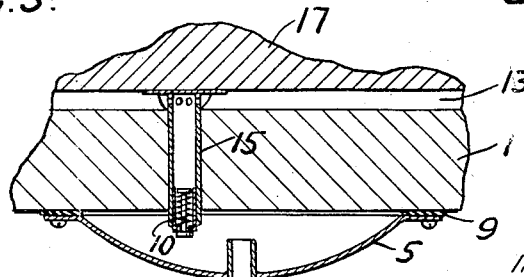
Figure 4 is a detail view of the vacuum reservoir and connections.

In the construction shown in Fig. 5, the blanket 23 is provided with an inflatable tube 31 extending continuously around the edge of the blanket, and preferably formed integrally therewith. A pair of angle irons 27 are welded together, edge to edge, and secured to the lower face of the table 1 along the edge thereof to form an upwardly opening channel 29 extending completely around the table 1, which in this case may be of any desired shape, as rectangular, oval, etc.

A channel member 33 is adapted to be secured to one of the angle irons 27 by machine screws 35, as shown in Fig. 5, and when so secured substantially closes the channel 29.

The blanket 23 is attached to the platform 1 by placing the tube 31 in the channel 29, securing the channel 33 in place, and inflating the tube through one or more tire valves of conventional type (not shown). The inflated tube is retained in the channel 29 and so secures the blanket in the position shown in Fig. 5. When the air is exhausted from beneath the blanket, through nipple 7, atmospheric pressure forces the blanket 23 into the channels 11, and an air-tight seal is effected.

What I claim and desire to protect by Letters Patent is:

Apparatus for use in shaping materials comprising a portable platform having an upper surface adapted to receive a forming mandrel, an impervious blanket and means for securing said impervious blanket to said platform so as to cover the upper surface thereof, said means including an inflatable tube formed at the free edge of said blanket, a channel adapted to receive said tube said channel being supported from and extending peripherally around the platform, means for at least partially closing said channel to retain said tube within the channel when inflated, a vacuum conduit adapted to be connected with a source of vacuum, and channels providing communication between the upper surface of said platform and said vacuum conduit.

ROBERT J. NEBESAR.